US008973641B1

(12) United States Patent
Baghdasarian (10) Patent No.: US 8,973,641 B1
(45) Date of Patent: Mar. 10, 2015

(54) ROLL-UP CONTAMINATION COVER (71) Applicant: Space Systems/Loral, Inc., Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 422 days.

(21) Appl. No.: 13/665,717

(22) Filed: Oct. 31, 2012

(51) Int. Cl.
*G03B 11/04* (2006.01)

(52) U.S. Cl.
USPC ............................. 160/122; 359/507

(58) Field of Classification Search
USPC ......... 160/330, 120, 122, 309, 313, 238, 315, 160/239
See application file for complete search history.

(56) References Cited

U.S. PATENT DOCUMENTS

| | | | | |
|---|---|---|---|---|
| 198,573 | A * | 12/1877 | Copeland | 160/314 |
| 1,615,931 | A * | 2/1927 | Cann | 160/239 |
| 1,836,387 | A * | 12/1931 | Nye | 160/267.1 |
| 2,311,348 | A * | 2/1943 | Peters et al. | 160/239 |
| 2,521,455 | A * | 9/1950 | Gorgun | 160/239 |
| 2,811,201 | A * | 10/1957 | Reid, Jr. | 160/122 |
| 2,826,523 | A * | 3/1958 | Blaszkowski et al. | 428/12 |
| 2,897,888 | A * | 8/1959 | Dragonuk | 160/99 |
| 3,193,600 | A * | 7/1965 | Ronzio et al. | 264/102 |
| 4,807,684 | A * | 2/1989 | Melton | 160/23.1 |
| 4,809,760 | A * | 3/1989 | Lew | 160/120 |
| 4,825,921 | A * | 5/1989 | Rigter | 160/23.1 |
| 5,362,119 | A * | 11/1994 | Rosentratter | 296/97.8 |
| 5,784,189 | A * | 7/1998 | Bozler et al. | 359/254 |
| 5,913,564 | A * | 6/1999 | Stewart et al. | 296/172 |
| 6,309,076 | B1 * | 10/2001 | McVicker | 359/601 |
| 6,948,542 | B2 * | 9/2005 | Abouloukme | 160/24 |
| 7,008,009 | B2 * | 3/2006 | Grimm et al. | 296/214 |
| 7,144,123 | B2 | 12/2006 | Lungren et al. | |
| 7,347,019 | B1 * | 3/2008 | Shaw | 40/607.01 |
| 7,530,187 | B1 * | 5/2009 | Dreka | 40/591 |
| 7,878,456 | B2 | 2/2011 | Lundgren et al. | |
| 8,064,154 | B2 | 11/2011 | Bertuccio et al. | |
| 8,146,862 | B2 | 4/2012 | Chirivella et al. | |
| 8,430,148 | B2 * | 4/2013 | Thalhammer et al. | 160/23.1 |
| 2006/0011309 | A1 * | 1/2006 | Vicari et al. | 160/24 |
| 2008/0191511 | A1 * | 8/2008 | Neuer et al. | 296/98 |
| 2009/0074993 | A1 * | 3/2009 | Gao et al. | 428/12 |
| 2014/0130990 | A1 * | 5/2014 | Wong | 160/309 |

FOREIGN PATENT DOCUMENTS

JP 2009190661 A 8/2009

* cited by examiner

*Primary Examiner* — Katherine Mitchell
*Assistant Examiner* — Johnnie A Shablack
(74) *Attorney, Agent, or Firm* — Weaver Austin Villenueve & Sampson (57) ABSTRACT

Various roll-up contamination covers for shielding sensors and other sensitive equipment from particulate contamination are provided. Such covers may be provided by using a sheet of flexible material that has an elastically stable state of a spiral torsion spring, e.g., a clock spring shape. The spiral torsion spring may be anchored to a frame along one end that is substantially parallel to the center axis of the spiral torsion spring, and may be unrolled into a substantially unrolled state so as to cover an aperture in the frame. A movable release mechanism may be engaged with the unrolled end of the spiral torsion spring to prevent the spiral torsion spring from returning to the elastically stable state. When the release mechanism is moved to release the unrolled end of the spiral torsion spring, the spiral torsion spring may roll back into the elastically stable state and uncover the aperture.

23 Claims, 10 Drawing Sheets

ROLL-UP CONTAMINATION COVER

TECHNICAL FIELD

This invention relates generally to retractable contamination prevention covers useful for shielding sensor apertures and other equipment from particulate contamination. More specifically, this disclosure relates to roll-up contamination covers that may be used on spacecraft to protect spacecraft sensor systems from debris generated during spacecraft assembly, delivery vehicle installation, launch, and orbital maneuvering.

BACKGROUND OF THE INVENTION

The assignee of the present invention manufactures and deploys spacecraft for, inter alia, communications and broadcast services. Spacecraft often include various sensor systems, e.g., optical systems including star trackers, sun trackers, or earth-pointing cameras. Such sensors are often located on the main body of the spacecraft, or may be recessed slightly within a niche of the main body.

Spacecraft are typically assembled in clean room environments to preclude, among other things, the possibility of contamination of spacecraft systems such as the sensors. However, there is still a risk of sensor contamination, e.g., particulate contamination, when the spacecraft is launched into orbit. For example, particulates may be generated by the spacecraft's propulsion systems used to achieve orbit. Such particulates may impact the sensors and degrade sensor performance, e.g., partially obscure the field of view.

There is thus a need for retractable contamination covers for use in protecting satellite sensor systems.

SUMMARY OF INVENTION

The systems, methods and devices of this disclosure each have several innovative aspects, no single one of which is solely responsible for the desirable attributes disclosed herein. One innovative aspect of the subject matter described in this disclosure can be implemented in a variety of ways.

The present inventor has appreciated that contamination cover for shielding sensor apertures from particulate contamination may be provided by using a sheet of flexible material that has an elastically stable state of a spiral torsion spring, e.g., a clock spring shape. The spiral torsion spring may be anchored to a frame along one end that is substantially parallel to the center axis of the spiral torsion spring or a cylinder axis generally defined by a cylinder substantially bounded by the outer rolled surface of the spiral torsion spring, and may be unrolled into a substantially unrolled state so as to cover an aperture in the frame that substantially encircles the sensor aperture. A movable release mechanism may be engaged with the unrolled end of the spiral torsion spring to prevent the spiral torsion spring from returning to the elastically stable state. When the release mechanism is moved to release the unrolled end of the spiral torsion spring, the spiral torsion spring rolls back into the elastically stable state and uncovers the aperture.

In some implementations, an apparatus may be provided that includes a frame, a first roll-up contamination cover, and a release mechanism. The frame may include a first aperture through the frame. The first roll-up contamination cover may include a first thin strip of material and the first end of the first thin strip of material may be connected with the frame. The first thin strip, when unrolled from an elastically stable first clock spring shape into an elastically unstable and substantially unrolled first configuration, may have a substantially planar area sufficient to cover the first aperture. The release mechanism may be configured to transition the apparatus between a first state and a second state. In the first state, the first roll-up contamination cover may be in the elastically unstable and substantially unrolled first configuration, and the release mechanism may prevent the first roll-up contamination cover from returning to the elastically stable first clock spring shape. In the second state, the release mechanism may not prevent the first roll-up contamination cover from returning to the elastically stable first clock spring shape.

In some further implementations, the frame may include a second aperture through the frame and the apparatus may further include a second roll-up contamination cover. The second roll-up contamination cover may include a second thin strip of material formed into an elastically-stable second clock spring shape. A second end of the second thin strip of material may be connected with the frame and the second thin strip may have a length and width, when unrolled from the elastically-stable second clock spring shape into an elastically unstable and substantially unrolled second configuration, sufficient to cover the second aperture. In the first state, when the second roll-up contamination cover is in the elastically unstable and substantially unrolled second configuration, the release mechanism may prevent the second roll-up contamination cover from returning to the elastically-stable second clock spring shape. In the second state, the release mechanism may not prevent the second roll-up contamination cover from returning to the elastically-stable second clock spring shape from the elastically unstable and substantially unrolled second configuration.

In some further implementations, the first roll-up contamination cover may have a substantially cylindrical shape with a first cylindrical axis when in the elastically-stable first clock spring shape. A first free edge of the first roll-up contamination cover opposite the first end may be non-parallel to the first cylindrical axis. The release mechanism may include a movable portion with a first release edge substantially parallel to the first free edge when the first roll-up contamination cover is in the elastically unstable and substantially unrolled first configuration. The first release edge may overlap the first free edge by a first amount when the release mechanism is in the first state and the first roll-up contamination cover is in the elastically unstable and substantially unrolled first configuration, and may not overlap the first free edge when the release mechanism is in the second state and the first roll-up contamination cover is in the elastically unstable and substantially unrolled first configuration. The release mechanism may be configured to move the movable portion along an axis parallel to the first cylindrical axis when transitioned between the first state and the second state.

In some implementations, the first thin strip of material may include a first pattern of holes through the first thin strip at the first end, and the frame may include a second pattern of holes corresponding to the first pattern of holes through the first thin strip. The cover apparatus may further include a plurality of fasteners selected from the group consisting of screws and rivets. The first end of the first thin strip of material may be connected with the frame via the fasteners, wherein each of the fasteners is inserted into a different one of the holes in the first pattern and a corresponding hole in the second pattern.

In some implementations, the frame may include an aperture portion containing the first aperture and the aperture portion may be substantially flat. In some further implementations, the first thin strip may be substantially flat when in the elastically unstable and substantially unrolled first configuration.

In some other implementations, the frame may include an aperture portion containing the first aperture and the first roll-up contamination cover may have a substantially cylindrical shape with a first cylindrical axis when in the elastically-stable first clock spring shape. In such implementations, the aperture portion may have a curved profile when viewed along the first cylindrical axis. In some such implementations, the first thin strip substantially follows the curved profile when in the elastically unstable and substantially unrolled first configuration.

In some implementations, the first thin strip of material may be between 5 and 10 mils thick. In some implementations, the first thin strip of material may be made from a material selected from the group consisting of metal, plastics, and composites. In some such implementations where the material is a metal, the first thin strip of material may be made from a material selected from the group consisting of copper-beryllium alloys and stainless steel alloys.

In some implementations, the first thin strip of material may have a first side and a second side, and when the first roll-up contamination cover is in the elastically-stable first clock spring shape, most of the first side may be in contact with the second side.

In some implementations, the release mechanism may include an actuator configured to transition the release mechanism from the first state to the second state. In some such implementations, the release mechanism may further include a restraint device and the actuator may be configured to linearly displace the restraint device in a first direction and release the first roll-up contamination cover when the piston is driven. In some such implementations, the actuator may be a paraffin actuator that includes a piston configured to be driven by expansion of a constrained volume of paraffin wax in response to heat applied to the paraffin wax.

In some implementations, the actuator may be a solenoid. In other implementations, the actuator may be a shape-memory alloy. In yet other implementations, the actuator may be a compressed spring device with a controllable release device, and decompression of the spring device may release the first roll-up contamination cover.

In some implementations, the apparatus may also include a spring configured to apply a restoring force to the restraint device in a direction opposite the first direction.

In some implementations, the frame may include an aperture portion containing the first aperture and a first side wall portion. The first side wall portion may be substantially perpendicular to the first aperture portion, and the actuator may be mounted to the first side wall portion such that the restraint device is linearly displaced along an axis parallel to the aperture portion when the piston is driven.

In some implementations, the frame may further include a second side wall portion that is substantially perpendicular to the first aperture portion. The second side wall portion may also include a guide hole through the second side wall, and the restraint device may include a guide post extending through the guide hole along the first direction, the guide post configured to slide through the guide hole.

In some such implementations, the actuator may be located between the first side wall portion and the second side wall portion.

In some implementations, the actuator may include a movable portion and a fixed portion, the fixed portion fixed with respect to the frame, and the fixed portion is located on a side of the first side wall portion facing away from the second side wall portion.

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

FIGS. 2A through 10D are drawn to-scale within each Fig., although the scale between Figs. may differ.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" is also used as a shorthand notation for "and/or."

Figure 1A:
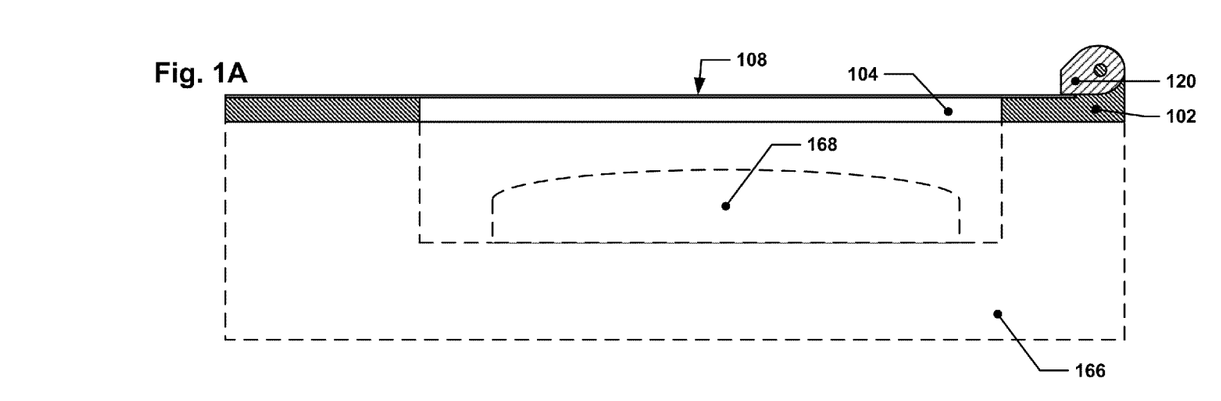
FIG. 1A depicts a side view of a conceptual example roll-up contamination cover assembly in the closed state.

FIG. 1A depicts a side view of a conceptual example roll-up contamination cover assembly in the closed state. Visible in FIG. 1A are a first roll-up contamination cover 108, a frame 102, and a release mechanism 120. The frame 102 has a first aperture 104 through it, e.g., a window, that the first roll-up contamination cover 108 covers when the roll-up contamination cover assembly is in the closed state. The roll-up contamination cover assembly shown may be connected to a portion of a satellite 166 that houses a recess for a sensor 168 (shown in dashed lines).

Figure 1B:
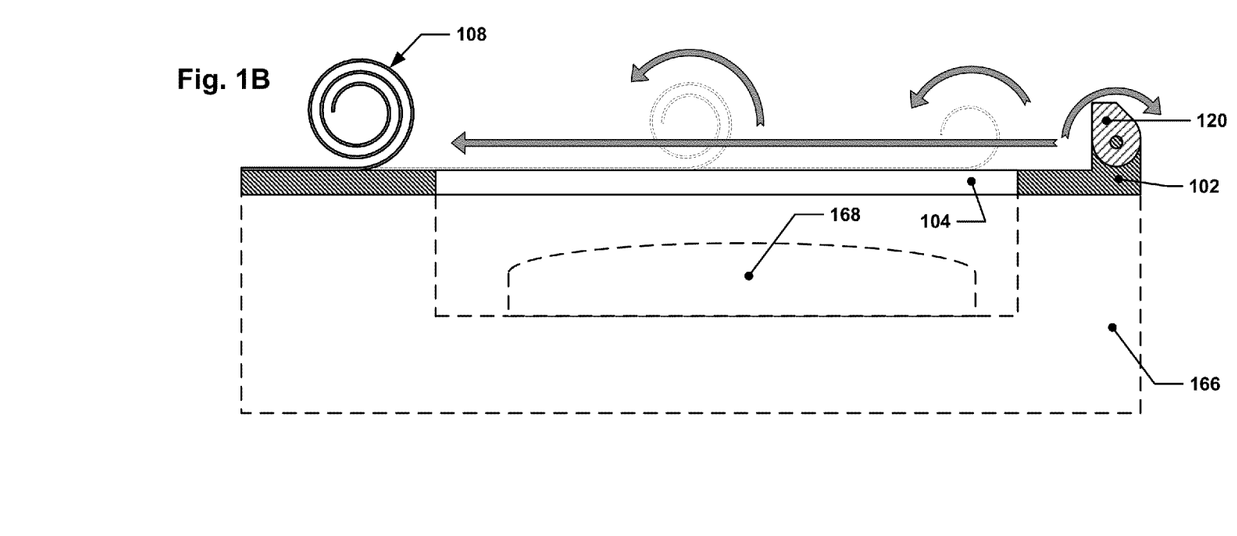
FIG. 1B depicts a side view of the example roll-up contamination cover assembly of FIG. 1A in the open state.

FIG. 1B depicts a side view of the example roll-up contamination cover assembly of FIG. 1A in the open state. As can be seen, the release mechanism 120 has rotated so as to release one end of the first roll-up contamination cover 108. This allows the first roll-up contamination cover 108 to roll up into an elastically stable state, thus revealing the first aperture 104 and the sensor 168 located behind the aperture 104. Intermediate stages of the first roll-up contamination cover 108 during the cover retraction are shown in dashed lines.

Figure 2A:
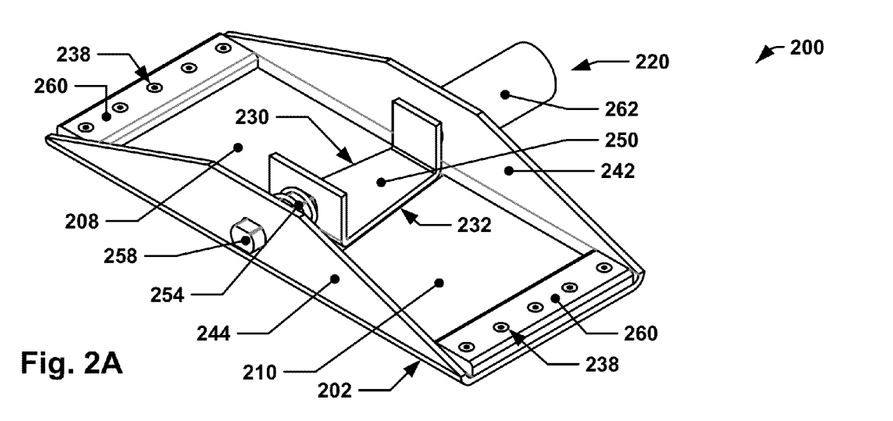
FIG. 2A depicts an isometric view of a 2-aperture roll-up contamination cover assembly in the closed state.

FIG. 2A depicts an isometric view of a 2-aperture roll-up contamination cover assembly in the closed state. The roll-up contamination cover assembly 200 may include a frame 202, which may have one or more apertures through it (not visible in this Fig., but visible in later figures). The frame may, for example, be fashioned to have a first side wall portion 242 and a second side wall portion 244 that may be used to support, for example, a release mechanism 220. The frame 202 may take other shapes as well, and may not necessarily include the first side wall portion 242 and the second side wall portion 244, especially if the release mechanism 220 is provided using components different from those pictured in FIG. 2A.

Figure 4:
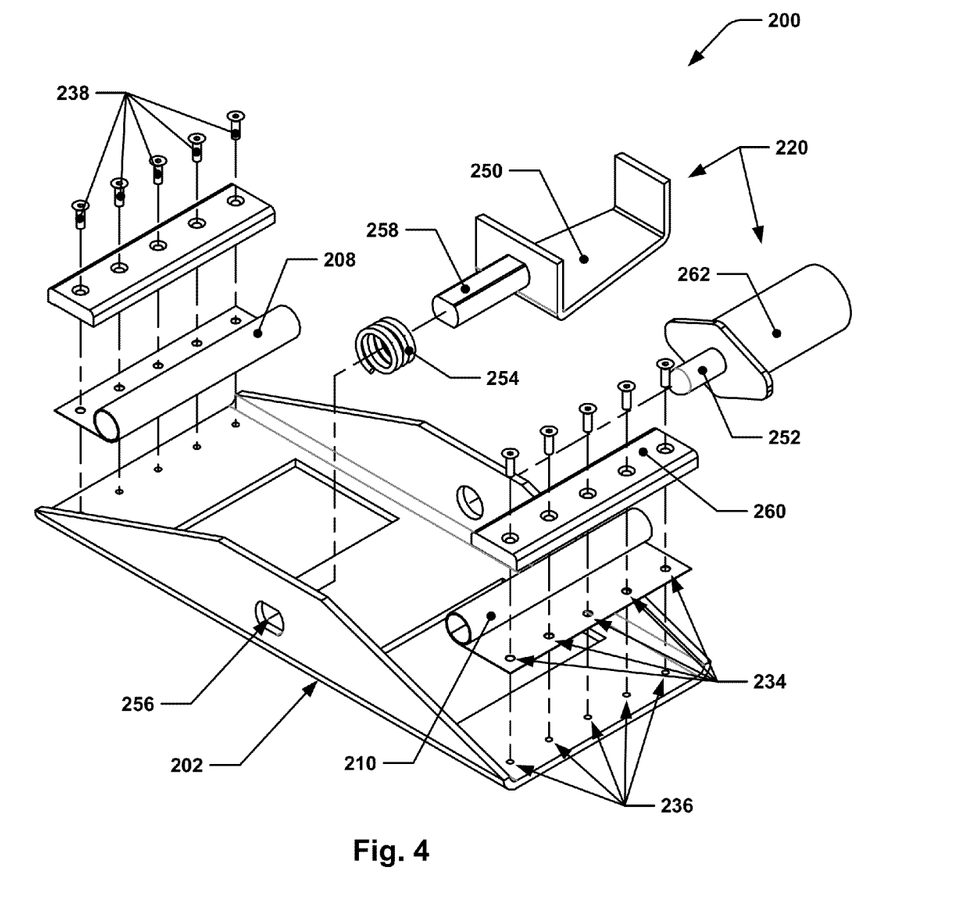
FIG. 4 depicts an isometric exploded view of the 2-aperture roll-up contamination cover assembly of FIG. 2A.

The roll-up contamination cover assembly 200 may also include one or more roll-up contamination covers, such as a first roll-up contamination cover 208 and a second roll-up contamination cover 210. The first roll-up contamination cover 208 and the second roll-up contamination cover 210 may be formed from thin, e.g., 5 to 10 mils thick, strips of material that have a spiral torsion spring or clock-spring shape in their elastically stable states, for example. Other thicknesses of material may be used as well depending on the design requirements. The first roll up contamination cover 208 and the second roll up contamination cover 210 may be secured to the frame 202 by clamps 260 and fasteners 238 at a fixed end. As illustrated in FIG. 4C, the fasteners 238 may pass through a first pattern of holes 234 in the fixed end of the first roll-up contamination cover 208, and through a second pattern of holes 236 in frame 202. Free ends of the first roll up contamination cover 208 and the second roll up contamination cover 210 opposite the fixed ends may be trapped, when the first roll up contamination cover 208 and the second roll up contamination cover 210 are unrolled into an elastically unstable and substantially unrolled state, between a restraint device 250 and the frame 202. The restraint device 250 may be part of a release mechanism 220. The restraint device 250 may prevent the free ends from lifting away from the frame 202 and prevents the first roll up contamination cover 208 and the second roll up contamination cover 210 from rolling up into their elastically stable states.

The restraint device 250 may be configured to slide along an axis parallel to a center axis of the spiral torsion spring. For example, a guide post 258 that is connected to one end of the restraint device 250 may slide through a guide hole 256, and the opposite end of the restraint device 250 may be acted on by an actuator 262. The actuator 262 may be configured to translate the restraint device 250 in a direction substantially parallel to the spiral torsion spring axis or axes. A spring 254 may be centered on the guide post 258 and interposed between the restraint device 250 and the second side wall portion 244 so as to provide a restoring force that pushes the restraint device 250 towards the actuator 262. The restraint device 250 may have a first release edge 230 and a second release edge 232. The first release edge 230 may be substantially parallel to the free edge of the first roll-up contamination cover 208 that is trapped between the restraint device 250 and the frame 202, and the second release edge 232 may be substantially parallel to the free edge of the second roll-up contamination cover 210 that is trapped between the restraint device 250 and the frame 202. The first release edge 230 and the second release edge 232 may be non-parallel. Thus, when the restraint device 250 is displaced towards the second side wall portion 244 by the actuator 262, the first roll up contamination cover 208 and the second roll up contamination cover 210 may be released along their respective free edges in a substantially simultaneous fashion along each free edge (although the release of each contamination cover may be staggered, if desired).

Figure 2B:
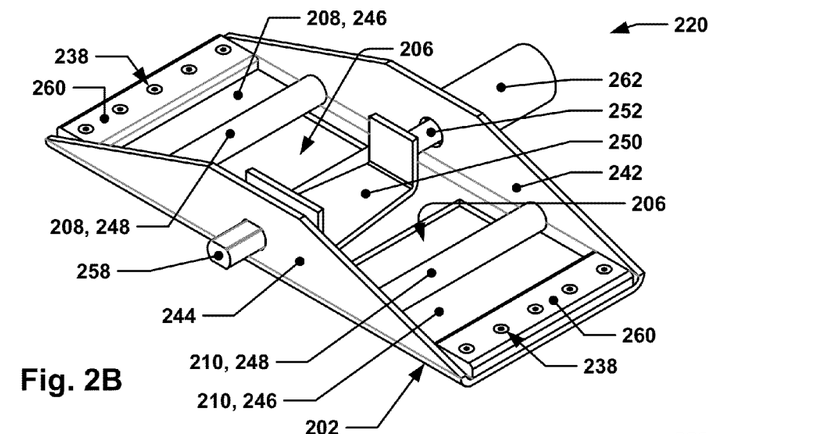
FIG. 2B depicts an isometric view of the 2-aperture roll-up contamination cover assembly of FIG. 2A in a semi-opened state.

FIG. 2B depicts an isometric view of the 2-aperture roll-up contamination cover assembly of FIG. 2A in a semi-opened state. As can be seen, the restraint device 250 has been moved to a position closer to the second side wall portion 244, causing the first release edge 230 and the second release edge 232 to release the first roll up contamination cover 208 and the second roll up contamination cover 210, respectively. The first roll up contamination cover 208 and the second roll up contamination cover 210 have started to roll back into their elastically stable configurations, i.e., into a spiral torsion spring shape. As can be seen, the roll-up contamination covers each have a first side 246 and a second side 248. When the roll-up contamination covers retract by rolling up, the second side 248 may form the exterior surface of the rolled-up portion of the cover. The first side 246 may face the interior of the rolled-up portion of the cover. In some implementations, the second side 248 may come into sliding contact with the first side 246 when the cover is rolled up. In other implementations, this may not occur.

As the first roll up contamination cover 208 and the second roll up contamination cover 210 roll back into their elastically stable states, a first aperture 204 and a second aperture 206 may be exposed. It is to be understood that the "elastically stable state" in the context of a roll up contamination cover refers to the state that the roll up contamination cover relaxes into when released by the release mechanism.

Figure 2C:
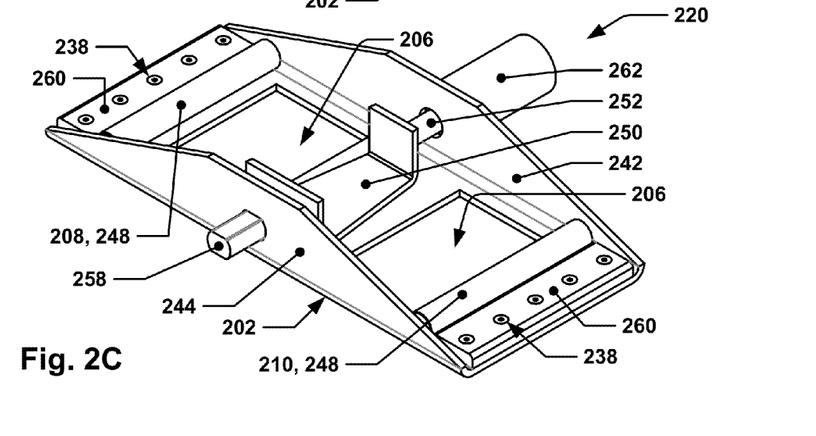
FIG. 2C depicts an isometric view of the 2-aperture roll-up contamination cover assembly of FIG. 2A in the opened state.

FIG. 2C depicts an isometric view of the 2-aperture roll-up contamination cover assembly of FIG. 2A in the opened state. As can be seen, both the first aperture 204 and the second aperture 206 are fully exposed, and the first roll up contamination cover 208 and the second roll up contamination cover 210 are fully retracted, i.e., returned to their elastically stable states.

Figure 3A:
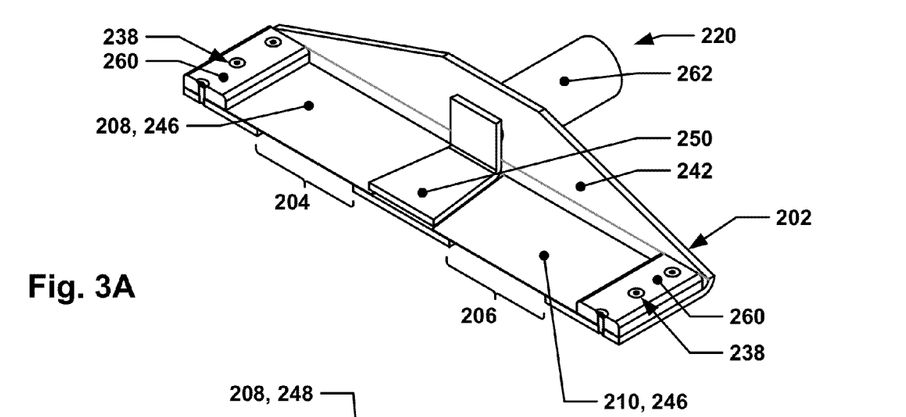
FIG. 3A depicts an isometric section view of the 2-aperture roll-up contamination cover assembly of FIG. 2A in the closed state.
Figure 3B:
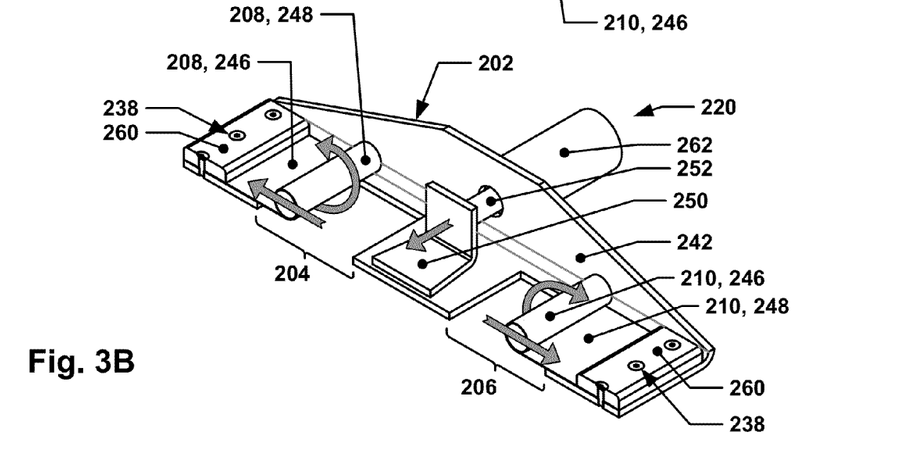
FIG. 3B depicts an isometric section view of the 2-aperture roll-up contamination cover assembly of FIG. 2A in the semi-opened state.
Figure 3C:
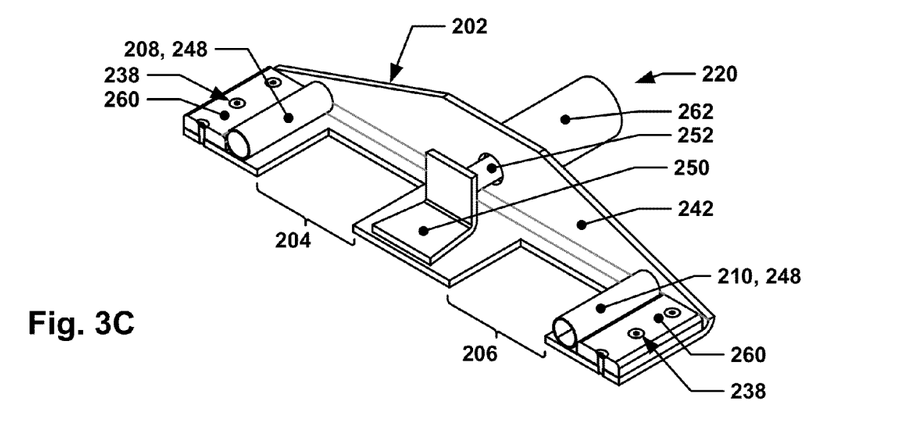
FIG. 3C depicts an isometric section view of the 2-aperture roll-up contamination cover assembly of FIG. 2A in the opened state.

FIG. 3A depicts an isometric section view of the 2-aperture roll-up contamination cover assembly of FIG. 2A in the closed state. FIG. 3B depicts an isometric section view of the 2-aperture roll-up contamination cover assembly of FIG. 2A in the semi-opened state. FIG. 3C depicts an isometric section view of the 2-aperture roll-up contamination cover assembly of FIG. 2A in the opened state. FIG. 4 depicts an isometric exploded view of the 2-aperture roll-up contamination cover assembly of FIG. 2A.

Figure 5A:
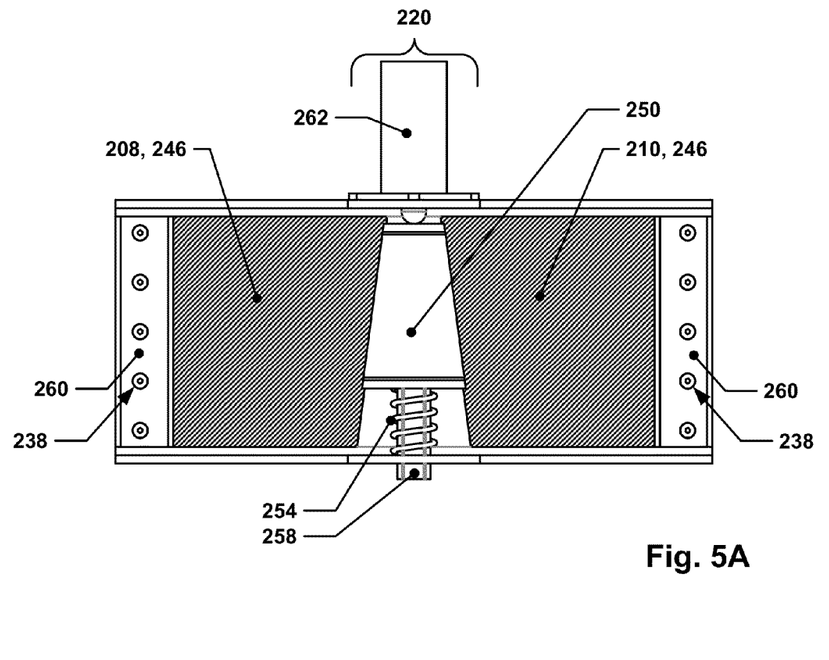
FIG. 5A depicts a plan view of the 2-aperture roll-up contamination cover assembly of FIG. 2A in the closed state.

FIG. 5A depicts a plan view of the 2-aperture roll-up contamination cover assembly of FIG. 2A in the closed state. The first roll up contamination cover 208 and the second roll up contamination cover 210 are shaded with diagonal hatching; as can be seen, the free edge of each roll-up contamination cover is at a slight angle from the axis of the spiral torsion spring (which, in this Fig., corresponds with the vertical direction). As can be further seen, the restraint device 250 slightly overlaps the free ends of the roll-up contamination covers, thus preventing them from rolling up into their elastically stable states.

Figure 5B:
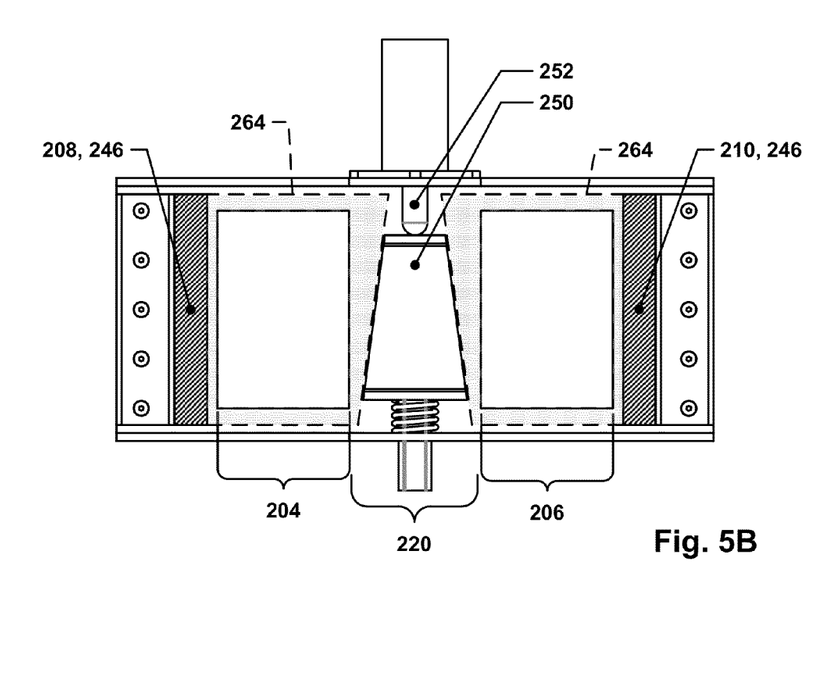
FIG. 5B depicts a plan view of the 2-aperture roll-up contamination cover assembly of FIG. 2A in the open state.

FIG. 5B depicts a plan view of the 2-aperture roll-up contamination cover assembly of FIG. 2A in the open state. In FIG. 5B, the first roll up contamination cover 208 and the second roll up contamination cover 210, indicated with the same hatching pattern as in FIG. 5A, have rolled up into their elastically stable states. The restraint device 250 has also been displaced by the piston 252 towards the bottom of FIG. 5B. The positions of the first roll up contamination cover 208 and the second roll up contamination cover 210 from FIG. 5A are indicated in FIG. 5B by dashed outlines 264 and a coarser cross-hatching pattern is used to show the areas of the frame 202 that were covered by the first roll up contamination cover 208 and the second roll up contamination cover 210 in FIG. 5A.

These views provide further insight and additional perspective into how such a device may function and how such a device is assembled. The various details of the actuator, restraint device, and fixturing methods for attaching the first roll up contamination cover 208 and the second roll up contamination cover 210 to the frame 202 may be changed as desired depending on the requirements of the particular sensor system being protected.

For example, a single roll-up contamination cover may be used rather than two roll-up contamination covers. Alternatively, additional roll-up contamination covers may be used. In the pictured example, the actuator 262 is a paraffin actuator. A paraffin actuator may include a constrained volume of paraffin wax inside that may be heated by a heating element (not shown), e.g., a resistive heater. As the paraffin actuator expands, it may exert pressure on a piston 252 that, in response to the pressure, moves in a linear fashion and provides linear translation output to the restraint device 250. Other actuators may be used as well, including solenoids, shape memory alloy, spring drive, etc.

Additionally, release mechanisms 220 using components other than the restraint device 250 shown may be used. For example, rotary clamps may engage the free end of the first roll up contamination cover 208 and the second roll up contamination cover 210. The rotary clamps may be configured so that they rotate about an axis substantially parallel to the center axis of the spiral torsion spring. The rotary clamps may thus be rotated so as to clamp down on the free ends of the roll-up contamination covers, and then rotated away from the free ends to release the free ends.

While the release mechanism 220 shown releases two roll up contamination covers with one movement, other implementations may feature independently controllable release mechanisms to allow the roll-up contamination covers to be released independently.

Roll-up contamination cover assemblies such as those shown provide a simple, reliable mechanism for protecting or shielding sensors from particulate contamination. Due to the light weight of the roll-up contamination covers, the spring forces that cause the roll-up contamination covers to return to the elastically stable state are also sufficient to overcome any inertial effects that may be experienced by the roll-up contamination covers, i.e., there is no need to positively latch or lock the open covers as their inherent spring force is sufficient to prevent undesired movement of the covers once they have been retracted.

Another benefit to roll-up contamination covers such as those shown is that the flexible nature of the roll-up contamination covers allows such covers to be used with non-planar frames. For example, a sensor aperture may be located on a curved part of a spacecraft, and a planar frame may not be feasible due to packaging considerations.

Figure 6A:
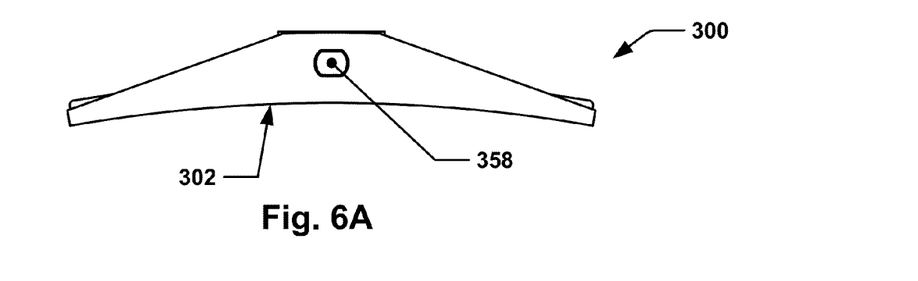
FIG. 6A depicts a side view of a curved, 2-aperture roll-up contamination cover assembly in the closed state.

FIG. 6A depicts a side view of a curved, 2-aperture roll-up contamination cover assembly in the closed state. As can be seen, the curved roll-up contamination cover assembly 300 is somewhat similar to the roll-up contamination cover assembly 200 of the earlier Figs. One notable exception is that frame 300 is curved in nature, as can be seen in the side view of FIG. 6A. This may allow the curved roll-up contamination cover assembly 300 to be attached to curved spacecraft main body surfaces or panels.

Figure 6B:
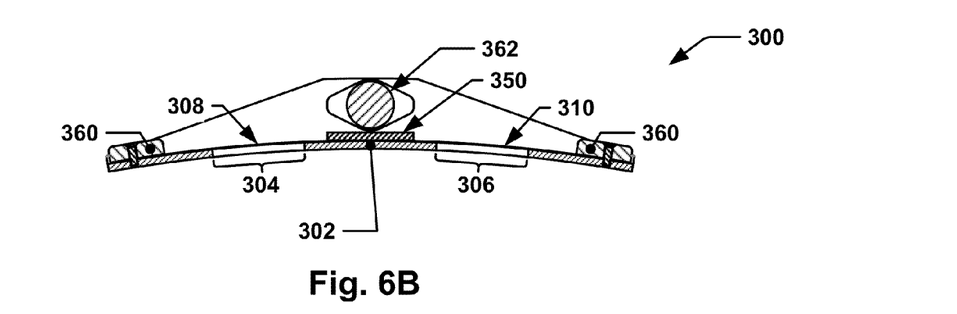
FIG. 6B depicts a side section view of the curved, 2-aperture roll-up contamination cover assembly of FIG. 6A in the closed state.
Figure 6C:
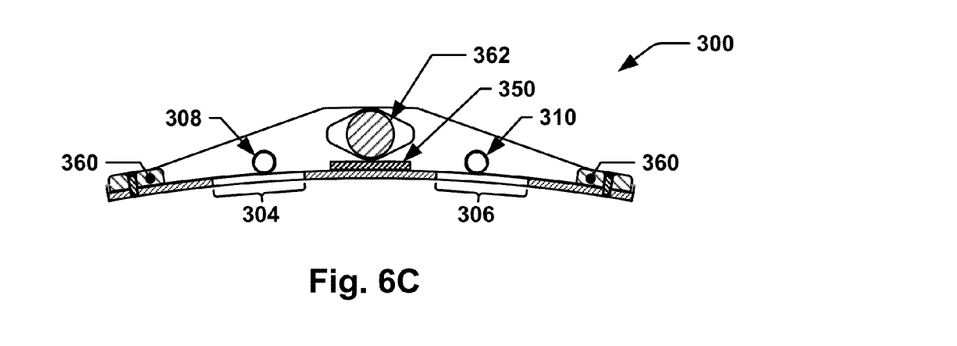
FIG. 6C depicts a side section view of the curved, 2-aperture roll-up contamination cover assembly of FIG. 6A in a semi-opened state.
Figure 6D:
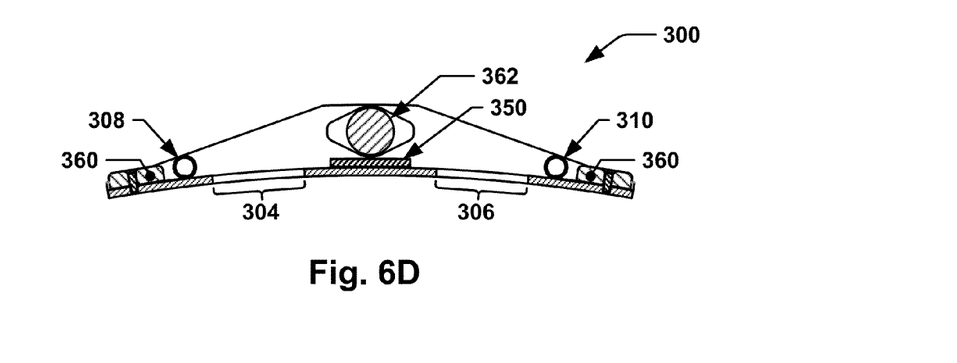
FIG. 6D depicts a side section view of the curved, 2-aperture roll-up contamination cover assembly of FIG. 6A in the open state.

FIG. 6B depicts a side section view of the curved, 2-aperture roll-up contamination cover assembly of FIG. 6A in the closed state. FIG. 6C depicts a side section view of the curved, 2-aperture roll-up contamination cover assembly of FIG. 6A in a semi-opened state. FIG. 6D depicts a side section view of the curved, 2-aperture roll-up contamination cover assembly of FIG. 6A in the open state. As can be seen, the states of the curved roll-up contamination cover assembly 300 shown in these Figs. are similar to the states shown in FIGS. 3A through 3C with respect to the roll-up contamination cover assembly 200. Another notable difference, however, is that the section views shown indicate that the actuator 362 is located within the bounds of the frame 302, rather than mounted to the outside of frame 302.

It is to be understood that, given the degree of similarity between the roll-up contamination cover assembly 200 and the curved roll-up contamination cover assembly 300, not all parts shown in FIGS. 6A through 6D, as well as other Figs. featuring the curved roll-up contamination cover assembly 300, may be specifically called out, although such components may be numbered such that the last two digits correspond to the last two digits of corresponding components in the roll-up contamination cover assembly 200.

Figure 7A:
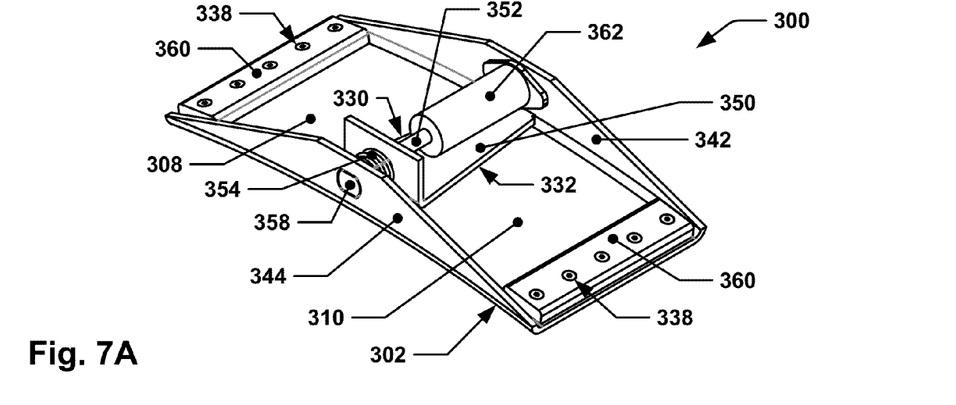
FIG. 7A depicts an isometric view of the curved, 2-aperture roll-up contamination cover assembly of FIG. 6A in the closed state.

FIG. 7A depicts an isometric view of the curved, 2-aperture roll-up contamination cover assembly of FIG. 6A in the closed state. As can be seen in further detail, the actuator 362 is located between the first side wall 342 and the second side wall 344. This reduces the overall footprint of the curved roll-up contamination cover assembly 300 over the roll-up contamination cover assembly 200. It is to be understood that the release mechanisms 220 and 320 shown herein may be used interchangeably between the curved and flat roll-up contamination cover assemblies, depending on the packaging considerations of a particular implementation.

Figure 7B:
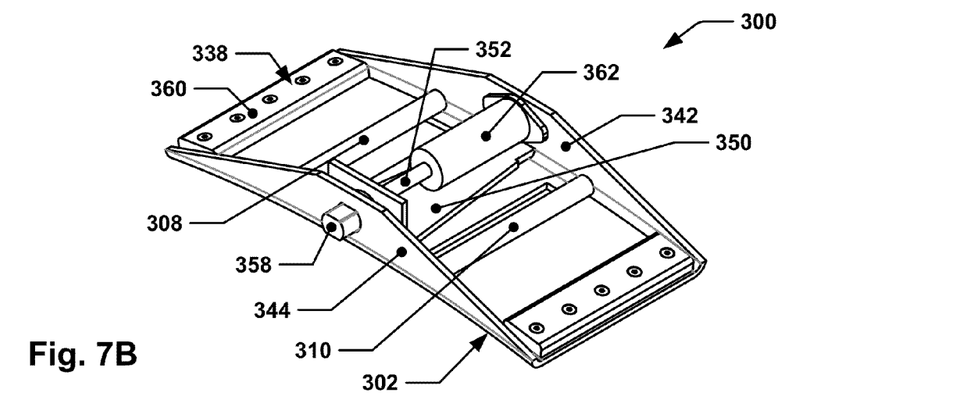
FIG. 7B depicts an isometric view of the curved, 2-aperture roll-up contamination cover assembly of FIG. 6A in the semi-opened state.
Figure 7C:
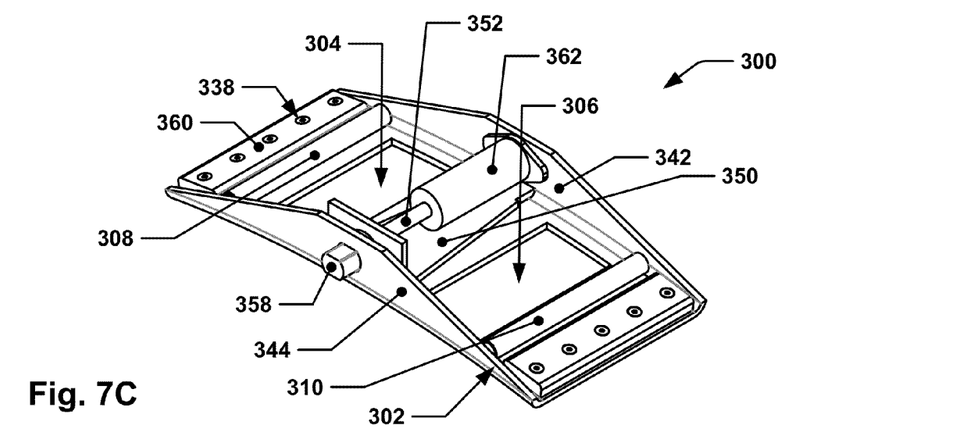
FIG. 7C depicts an isometric view of the curved, 2-aperture roll-up contamination cover assembly of FIG. 6A in the opened state.

FIG. 7B depicts an isometric view of the curved, 2-aperture roll-up contamination cover assembly of FIG. 6A in the semi-opened state. FIG. 7C depicts an isometric view of the curved, 2-aperture roll-up contamination cover assembly of FIG. 6A in the opened state.

Figure 8A:
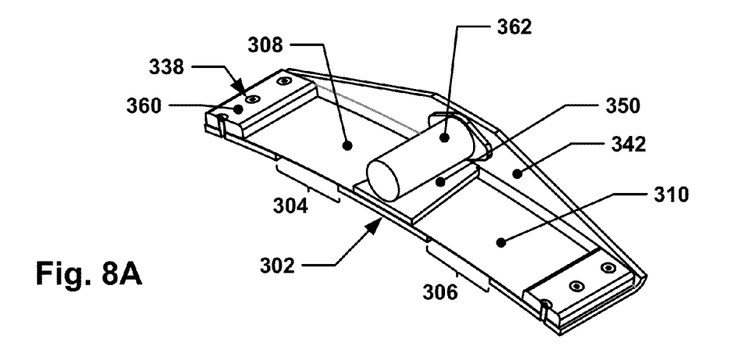
FIG. 8A depicts an isometric section view of the curved, 2-aperture roll-up contamination cover assembly of FIG. 6A in the closed state.
Figure 8B:
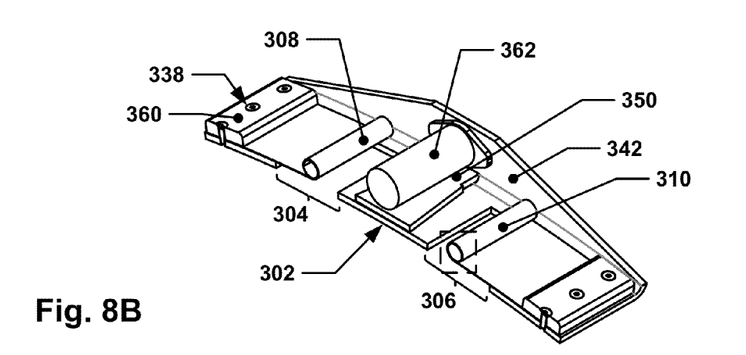
FIG. 8B depicts an isometric section view of the curved, 2-aperture roll-up contamination cover assembly of FIG. 6A in the semi-opened state.
Figure 8C:
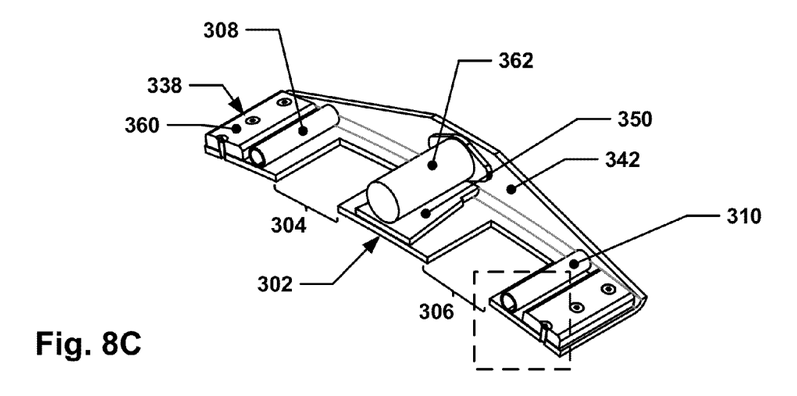
FIG. 8C depicts an isometric section view of the curved, 2-aperture roll-up contamination cover assembly of FIG. 6A in the opened state.

FIG. 8A depicts an isometric section view of the curved, 2-aperture roll-up contamination cover assembly of FIG. 6A in the closed state. FIG. 8B depicts an isometric section view of the curved, 2-aperture roll-up contamination cover assembly of FIG. 6A in the semi-opened state. FIG. 8C depicts an isometric section view of the curved, 2-aperture roll-up contamination cover assembly of FIG. 6A in the opened state.

Figure 9A:
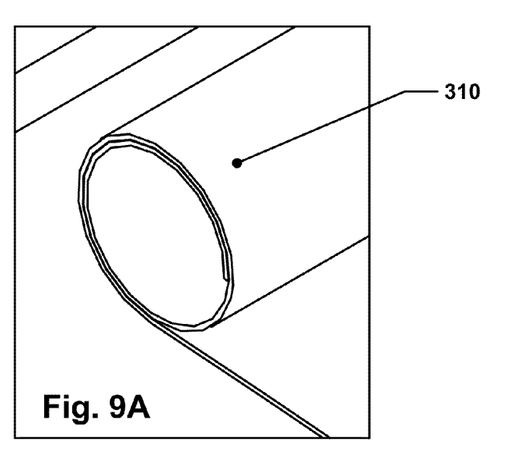
FIG. 9A depicts a detail view of a rectangular portion of FIG. 8B outlined in a dashed line.
Figure 9B:
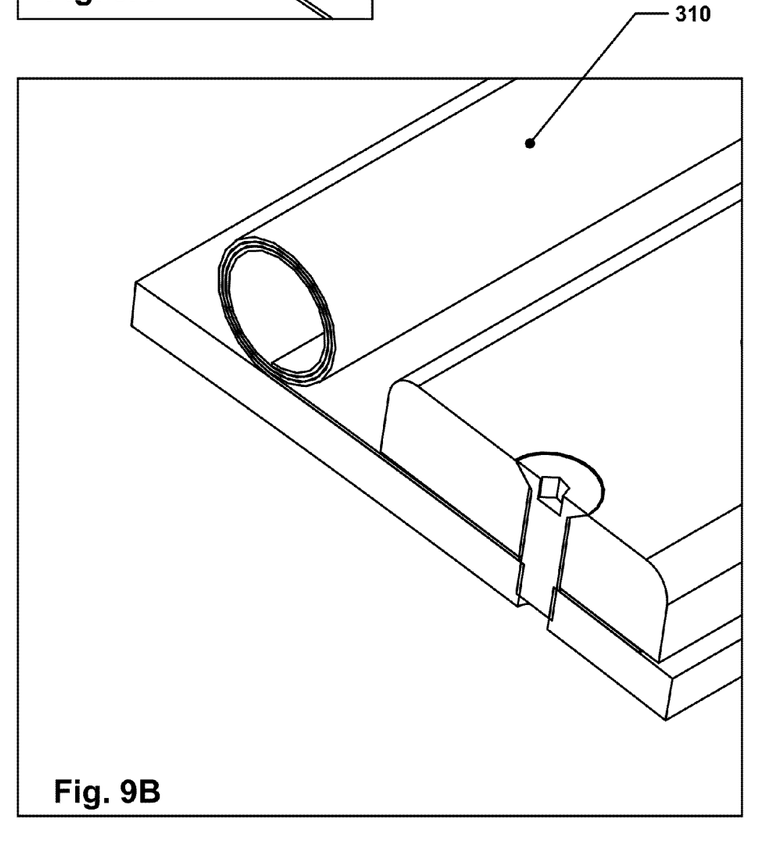
FIG. 9B depicts a detail view of a rectangular portion of FIG. 8C outlined in a dashed line.

FIG. 9A depicts a detail view of a rectangular portion of FIG. 8B outlined in a dashed line. As can be seen, the second roll-up contamination cover 310 is partially rolled up. FIG. 9B depicts a detail view of a rectangular portion of FIG. 8C outlined in a dashed line. As can be seen, the second roll-up contamination cover 310 is fully rolled up. The spiral torsion spring shape is clearly visible in these views.

Figure 10A:
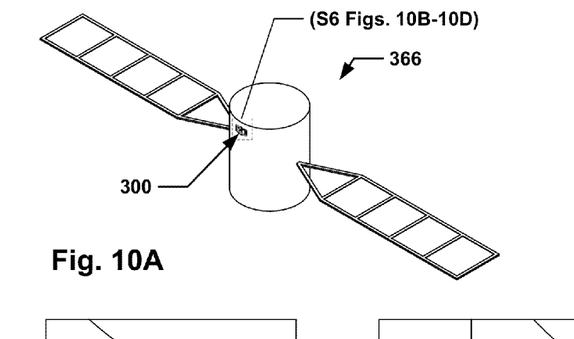
FIG. 10A depicts an isometric view of an example conceptual satellite utilizing an example roll-up contamination cover.

FIG. 10A depicts an isometric view of an example conceptual satellite utilizing an example roll-up contamination cover. A satellite 366 is shown with an installed curved roll-up contamination cover assembly 300 installed (the mounting features, e.g., holes, fasteners, etc., that secure the curved roll-up contamination cover assembly 300 to the satellite 366 are not shown).

Figure 10B:
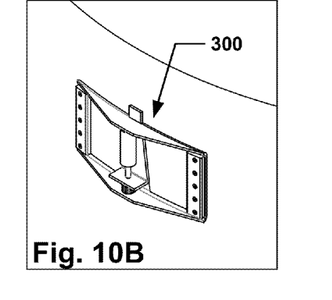
FIG. 10B depicts an isometric view of the detail area marked in FIG. 10A with the roll-up contamination cover in the closed state.
Figure 10C:
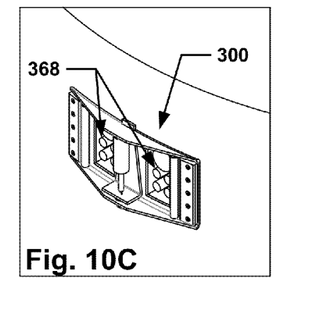
FIG. 10C depicts an isometric view of the detail area marked in FIG. 10A with the roll-up contamination cover in the open state.
Figure 10D:
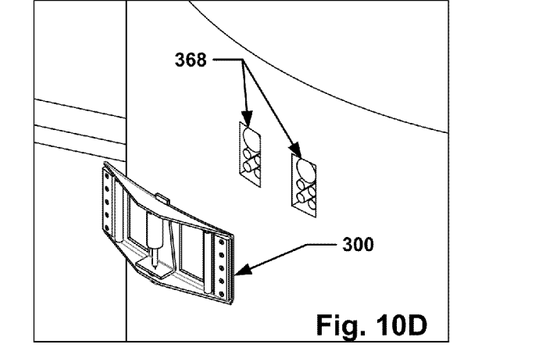
FIG. 10D depicts an isometric exploded view of the detail area marked in FIG. 10A.

FIG. 10B depicts an isometric view of the detail area marked in FIG. 10A with the roll-up contamination covers in the closed state. FIG. 10C depicts an isometric view of the detail area marked in FIG. 10A with the roll-up contamination covers in the open state. As can be seen, the open covers have a opened to reveal sensor elements 368 within recesses in the main body of the satellite 366. FIG. 10D depicts an isometric exploded view of the detail area marked in FIG. 10A. The sensor elements and recesses are more visible in this view. Of course, other types or arrangements of sensors may be used, as well as different aperture sizes and shapes.

The materials used in roll-up contamination cover assemblies may include metals, plastics, and other materials with appropriate material properties. For example, the frame may be made from machined or cast aluminum or titanium alloys, or other metals. Alternatively, the frame may be made from a composite or plastic. The release mechanism may be made from similar materials. The roll-up contamination covers themselves may be made from any flexible material that can be formed into a spiral torsion spring shape and that can be unrolled into a substantially unrolled condition without plastic yielding, e.g., spring steel, composites, plastics, etc. For example, the roll-up contamination covers may be made from a copper-beryllium alloy or a stainless steel alloy.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. An apparatus comprising:
   a frame, the frame including a first aperture through the frame;
   a first roll-up contamination cover, the first roll-up contamination cover including a first thin strip of material, wherein a first end of the first thin strip of material is connected with the frame and the first thin strip, when unrolled from an elastically stable first clock spring shape into an elastically unstable and substantially unrolled first configuration, has a substantially planar area sufficient to cover the first aperture; and
   a release mechanism, the release mechanism configured to transition the apparatus between a first state and a second state, wherein:
     in the first state, the first roll-up contamination cover is in the elastically unstable and substantially unrolled first configuration, and the release mechanism prevents the first roll-up contamination cover from returning to the elastically stable first clock spring shape,
     in the second state, the release mechanism does not prevent the first roll-up contamination cover from returning to the elastically stable first clock spring shape,
     the first roll-up contamination cover has a substantially cylindrical shape with a first cylindrical axis when in the elastically-stable first clock spring shape,
     a first free edge of the first roll-up contamination cover opposite the first end is non-parallel to the first cylindrical axis,
     the release mechanism includes a movable portion with a first release edge substantially parallel to the first free edge when the first roll-up contamination cover is in the elastically unstable and substantially unrolled first configuration,
     the first release edge overlaps the first free edge by a first amount when the release mechanism is in the first state and the first roll-up contamination cover is in the elastically unstable and substantially unrolled first configuration,
     the first release edge does not overlap the first free edge when the release mechanism is in the second state and the first roll-up contamination cover is in the elastically unstable and substantially unrolled first configuration, and
     the release mechanism is configured to move the movable portion along an axis parallel to the first cylindrical axis when transitioned between the first state and the second state.

2. The apparatus of claim 1, wherein:
   the first thin strip of material includes a first pattern of holes through the first thin strip at the first end,
   the frame includes a second pattern of holes corresponding to the first pattern of holes through the first thin strip; and
   the apparatus further comprises:
     a plurality of fasteners selected from the group consisting of screws and rivets, wherein the first end of the first thin strip of material is connected with the frame via the fasteners, wherein each of the fasteners is inserted into a different one of the holes in the first pattern and a corresponding hole in the second pattern.

3. The apparatus of claim 1, wherein the first thin strip of material is between 5 and 10 mils thick.

4. The apparatus of claim 1, wherein the first thin strip of material is made from a material selected from the group consisting of metal, plastics, and composites.

5. The apparatus of claim 1, wherein the first thin strip of material is made from a material selected from the group consisting of copper-beryllium alloys and stainless steel alloys.

6. The apparatus of claim 1, wherein:
the first thin strip of material has a first side and a second side, and
when the first roll-up contamination cover is in the elastically-stable first clock spring shape, most of the first side is in contact with the second side.

7. The apparatus of claim 1, wherein:
the frame includes a second aperture through the frame; and
the apparatus further comprises:
  a second roll-up contamination cover, the second roll-up contamination cover including a second thin strip of material formed into an elastically-stable second clock spring shape, wherein a second end of the second thin strip of material is connected with the frame and the second thin strip has a length and width, when unrolled from the elastically-stable second clock spring shape into an elastically unstable and substantially unrolled second configuration, sufficient to cover the second aperture, wherein:
    in the first state, when the second roll-up contamination cover is in the elastically unstable and substantially unrolled second configuration, and the release mechanism prevents the second roll-up contamination cover from returning to the elastically-stable second clock spring shape, and
    in the second state, the release mechanism does not prevent the second roll-up contamination cover from returning to the elastically-stable second clock spring shape.

8. The apparatus of claim 7, wherein:
the movable portion is located between the first and second apertures,
the second roll-up contamination cover has a substantially cylindrical shape with a second cylindrical axis when in the elastically-stable second clock spring shape,
a second free edge of the second roll-up contamination cover opposite the second end is non-parallel to the second cylindrical axis,
the movable portion has a second release edge that is substantially parallel to the second free edge when the second roll-up contamination cover is in the elastically unstable and substantially unrolled second configuration,
the second release edge overlaps the second free edge by a second amount when the release mechanism is in the second state and the second roll-up contamination cover is in the elastically unstable and substantially unrolled second configuration, and
the second release edge does not overlap the second free edge when the release mechanism is in the second state and the second roll-up contamination cover is in the elastically unstable and substantially unrolled second configuration.

9. The apparatus of claim 1, wherein:
the frame includes an aperture portion containing the first aperture, and
the aperture portion is substantially flat.

10. The apparatus of claim 9, wherein the first thin strip is substantially flat when in the elastically unstable and substantially unrolled first configuration.

11. The apparatus of claim 1, wherein:
the frame includes an aperture portion containing the first aperture,
the first roll-up contamination cover has a substantially cylindrical shape with a first cylindrical axis when in the elastically-stable first clock spring shape, and
the aperture portion has a curved profile when viewed along the first cylindrical axis.

12. The apparatus of claim 11, wherein the first thin strip substantially follows the curved profile when in the elastically unstable and substantially unrolled first configuration.

13. The apparatus of claim 1, wherein:
the release mechanism includes an actuator configured to transition the release mechanism from the first state to the second state.

14. The apparatus of claim 13, wherein the actuator is configured to linearly displace the movable portion in a first direction and release the first roll-up contamination cover when the actuator is driven.

15. The apparatus of claim 14, wherein the actuator is a paraffin actuator that includes a piston configured to be driven by expansion of a constrained volume of paraffin wax in response to heat applied to the paraffin wax.

16. The apparatus of claim 14, wherein the actuator is a solenoid.

17. The apparatus of claim 14, wherein the actuator is a shape-memory alloy.

18. The apparatus of claim 14, wherein:
the actuator is a compressed spring device with a controllable release device, and
decompression of the spring device releases the first roll-up contamination cover.

19. The apparatus of claim 14, further comprising:
a spring configured to apply a restoring force to the movable portion in a direction opposite the first direction.

20. The apparatus of claim 14, wherein:
the frame includes a first side wall portion and an aperture portion containing the first aperture,
the first side wall portion is substantially perpendicular to the first aperture portion, and
the actuator is mounted to the first side wall portion such that the movable portion is linearly displaced along the axis parallel to the first cylindrical axis when the actuator is driven.

21. The apparatus of claim 14, wherein:
the frame further includes a second side wall portion,
the second side wall portion is substantially perpendicular to the first aperture portion,
the second side wall portion includes a guide hole through the second side wall,
the restraint movable portion includes a guide post extending through the guide hole along the first direction, the guide post configured to slide through the guide hole.

22. The apparatus of claim 21, wherein:
the actuator is located between the first side wall portion and the second side wall portion.

23. The apparatus of claim 22, wherein:
the actuator includes a movable piston and a fixed portion,
the fixed portion is fixed with respect to the frame, and
the fixed portion is located on a side of the first side wall portion facing away from the second side wall portion.

* * * * *